March 22, 1960     O. CROMBERG ET AL     2,929,135
PROCESS FOR MANUFACTURING MULTIPLE COIL SPRINGS
FOR SLIDE FASTENERS AND METHOD OF ATTACHMENT
Filed Nov. 5, 1957     3 Sheets-Sheet 1

INVENTORS
OTTO CROMBERG,
GUSTAV PRITZBUER,
WALTER WINTERHOFF
HANS MAYER
by Nestern & Kollin
ATTORNEYS March 22, 1960 O. CROMBERG ET AL 2,929,135
PROCESS FOR MANUFACTURING MULTIPLE COIL SPRINGS
FOR SLIDE FASTENERS AND METHOD OF ATTACHMENT
Filed Nov. 5, 1957 3 Sheets-Sheet 3

INVENTORS
OTTO CROMBERG,
GUSTAV PRITZBUER,
WALTER WINTERHOFF
HANS MAYER by Mestern & Rollin
ATTORNEYS

2,929,135

PROCESS FOR MANUFACTURING MULTIPLE COIL SPRINGS FOR SLIDE FASTENERS AND METHOD OF ATTACHMENT

Otto Cromberg, Hagen, Westphalia, Gustav Pritzbuer, Hamburg, Walter Winterhoff, Wermelskirchen, and Hans Mayer, Hagen-Boele, Westphalia, Germany, assignors to Stahlwerk Kabel C. Pouplier, Jr., G.m.b.H., Hagen-Kabel, Germany Application November 5, 1957, Serial No. 694,583

Claims priority, application Germany May 18, 1954

3 Claims. (Cl. 29—410)

The present invention relates to the manufacture of multiple coil springs of even pitch angles and constant even pitch throughout the entire length of said springs, which springs are resistant to laundering, pressing and to corrosion; and more particularly to such springs which are employed as members in slide fasteners. The invention also relates to the attachment of such springs to the edges of material. This application is a continuation-in-part of a copending application, Serial No. 503,525 filed by the same applicants on April 8, 1955, now abandoned.

For economical as well as technical reasons many attempts have been made to make slide fasteners employing coil springs instead of the conventional box catch fasteners and slide fasteners with locking edges. In the coil spring fasteners used heretofore, it was common usage to hold the springs together and guide them by a slide so as to accomplish the necessary engagement for the practical use either by friction (closure by adhesion) or by shaping (closure by locking).

All previous attempts have been unsuccessful since all the conventional slide fasteners possess certain disadvantages in practical use. Some of the drawbacks are due to faulty design, others to impractical manufacturing methods, improper materials for making the wires, and, most important, to difficulties in the forming of the coil springs and in their attachment to the edges of material.

One of the main difficulties was a lack of understanding as to how the coil springs should be shaped. Attempts have been made to use a single wire, others to use multiple wires for providing closure members that will really lock in practice. It proved that smooth single wires had no holding power, so that some inventors tried to shape the wires in such a manner that they would hold together by locking engagement. Apart from being complicated and expensive, these methods likewise did not prove successful.

Similar experiences were made with multiple coil springs. Some attempts have been made to manufacture oppositely directed multiple coil springs, in which the gaps between windings were narrower than the sum of the combined wire diameters of a single winding, while others made the gaps equal to the sum, or even wider.

Obviously, only one of these principles of design can be correct, provided there is any relationship at all between these dimensions.

One of the reasons for the discrepancy in opinion as to how to shape coil springs was due to the fact that there is no manufacturing method known for making multiple coil springs in a manner which will ensure an even closure of such a slide fastener over its entire length.

In the known manufacturing methods for multiple coil springs, the windings are made separately and are thereafter threaded into each other. It is impossible to maintain in this type of manufacture the accuracy necessary for the manufacture of a slide fastener from coil springs and to maintain an accurate pitch, which would assure a uniform locking of the closure members. The smallest inaccuracies in the manufacture result in a complete failure. Finally, the hitherto known materials used for making coil springs and the treatment of these materials did not come up to the requirements for a slide fastener, that is to say—make it resistant against bending, laundering, pressing and against corrosion.

It is another difficulty to provide the proper attachment for the closure members of coil springs onto the edge of the material, since even with faultlessly manufactured coil springs, incomplete or otherwise objectionable attachment deprives the coil springs of the properties necessary for making a properly operating slide fastener. The attachment of the coil springs influences to a high degree the maintenance of a uniform pitch thereof.

The present invention has the object to provide a manufacturing process for multiple coil springs having even pitch angles throughout as well as a constant even pitch.

It is a further object of the present invention to provide a method of attaching the coil springs to the edges of material in such a manner as to guarantee a slide fastener being produced which over its entire length will have proper engagement between the closure members.

Other objects and features of the present invention will become apparent from the following description. Generally speaking, the present invention solves the problems involved by feeding simultaneously two or more smooth wires with equal circular cross sections from stationary bobbins or reels, placing them in parallel, closely adjacent to each other, and moving them in a straight line toward the coil-shaping device. This comprises a stationary grooved mandrel, the wires being pulled into the groove where they are received by a sleeve enclosing the mandrel serving as a bearing therefor. The sleeve has a smooth bore and rotates about the mandrel, whereby it is taking along the wires while winding them in the groove in an endless manner, so as to form the desired coils, finally moving them out of the device. The wires are fed into the sleeve at an angle ranging from 70 to 76° with respect to the common longitudinal axis of the mandrel and the sleeve, while the pitch angle of the groove in the mandrel with respect to the vertical is 20–14°, these angles adding up in each case to 90°.

In the further course of the winding process, the pitch angle of the spring coils is decreased to 10–14° in one or more steps.

The requirements of bending and pressing resistance are fulfilled by carrying out the above-mentioned coil winding process with a resilient material, more particularly spring steel having a minimum strength of 200 kg./sq. mm., which, after having undergone cold shaping is subjected to a heat treatment from 250–450° C. for ten minutes, resulting in an increase of the spring strength and an elimination of the winding tensions.

In order to properly attach the multiple coil springs, made according to the invention, to the edge of a material, a zigzag or angular zigzag double lock stitch is used for sewing the coils to the material in such a manner that upper and under threads are wound at equally spaced points around the windings of the multiple coil springs and are tied in several loops.

The method according to the invention makes it possible to wind two or several wires simultaneously, evenly, in parallel relationship with equal pitch angles and equal pitch, so as to form multiple coil springs which will, when attached, accomplish an excellent locking engagement between the closure members. The resilience of the springs which is guaranteed by the properties of the starting material, a spring steel of a minimum strength of 200 kg./mm.$^2$, and is increased by the heat treatment, also contributes to make this novel slide fastener fulfill all the requirements of resistance to bending, laundering, pressing, as well as corroding influences.

Attachment to the desired material with accurate maintenance of pitch can be accomplished by zigzag or angular double lock stitch. The seams may be made on normal sewing machines which only have to be adapted for even advancement of multiple coil springs and length of material in order to provide stitches of even spacing around the windings of the multiple coil springs.

The needle pierces at a certain distance corresponding to the pitch of the coil spring or to a multiple thereof, at first with a blind stitch between or outside of the windings of the coil springs, where a loop is formed between upper and under thread, which after a turn of the needle and repeated piercing of the material is pulled tight against the windings, in turn pulling the windings against the edge of the material. This method of sewing results, as mentioned before, in an accurate maintenance of an even pitch of the windings of the coils.

The invention will now be described with reference to the accompanying drawing, in which a few embodiments of the devices are illustrated by way of example:

Figure 1:
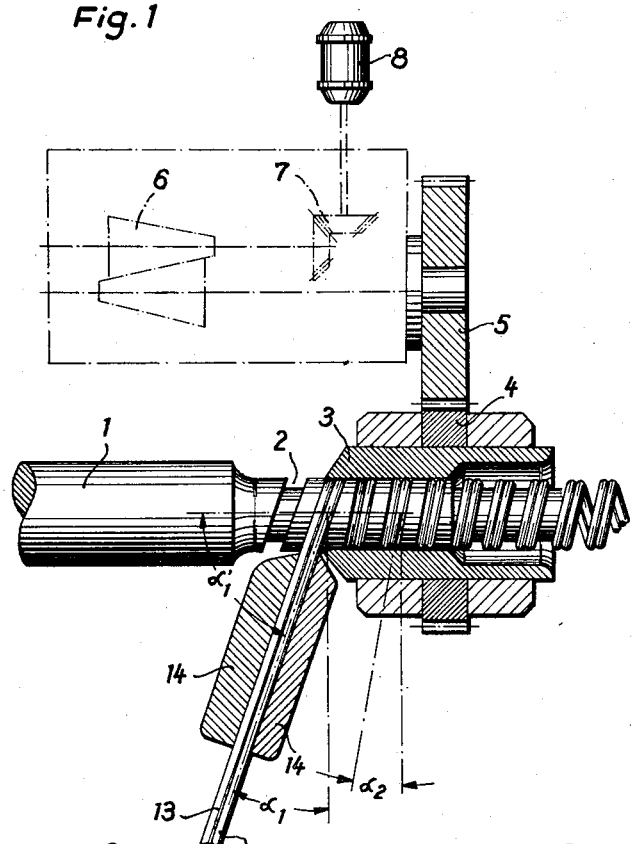
Fig. 1 is a diagrammatic view of the device for making multiple-coil springs.
Figure 2:
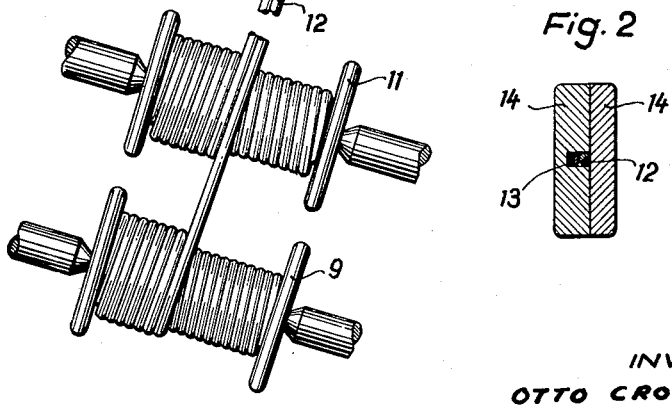
Fig. 2 is a cross section of the feeding device.
Figure 3:
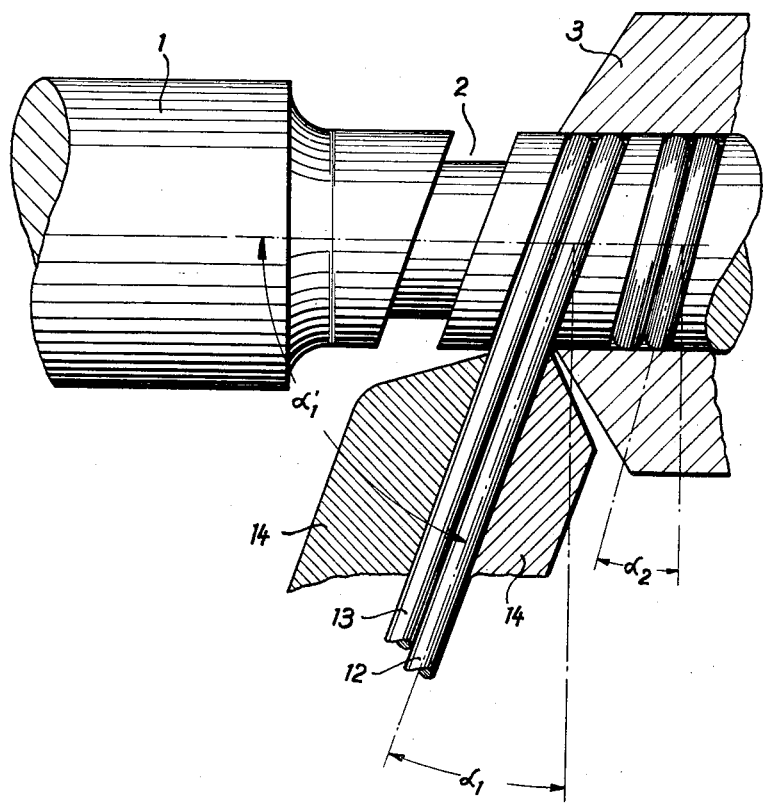
Fig. 3 shows part of the machine on an enlarged scale.

The device for making a multiple-coil spring according to the invention, comprises a stationary mandrel 1, provided with a helical groove 2, and received in a sleeve member 3. The sleeve 3 is driven from a motor 8 by way of gears 4, 5, and a controllable intermediate gearing 6, 7.

For unreeling the wires 12, 13 to be coiled, bobbins 9 and 11 are provided, from which the wires are passed through a guide member 14 and into the groove 2 of the mandrel.

The sleeve 3 pulls the wires in closely adjacent parallel position into groove 2, where they are wrapped around the mandrel 1, from which they are withdrawn as a double coil spring. The feed angle $\alpha_1^1$ of wires 12, 13 is 70–76° with respect to the common axis of the mandrel 1 and the sleeve 3, and adds up to an angle of 90° in combination with the pitch angle $\alpha_1$. In the further course, the pitch angle is changed to $\alpha_2$ ranging from 10–14°. Thus, the wires initially wound with a pitch angle of 20–14° leave the mandrel at the angle of 10–14°.

In the following, a few examples are given for the manufacture of multiple coil springs:

*Example 1*

The feed angle $\alpha_1^1$ of wires 12, 13 which is equal to the angle formed between the guiding groove 2 and the longitudinal axis of the mandrel and sleeve is 70°.

The pitch angle $\alpha_1$ of the thread-like groove 2 on the mandrel has to be 20° with respect to the vertical axis, when feed-in of wires 12, 13 is supposed to proceed in a straight line without a bend. The two angles $\alpha_1^1$ and $\alpha_1$ add up to 90°.

*Example 2*

The feed angle $\alpha_1^1$ of wires 12 and 13 which is equal to the angle between the guiding groove 2 and the longitudinal axis of the mandrel is 74°, the pitch angle $\alpha_1$ of the threaded groove 2 will then be 16° when feed-in of wires 12, 13 is supposed to proceed in a straight line without a bend. The two angles again add up to 90°.

*Example 3*

The feed-in angle $\alpha_1^1$ of wires 12, 13, which is equal to the angle formed between guiding groove 2 and the longitudinal axis of the mandrel is 76°, the pitch angle $\alpha_1$ of groove 2 has then to be 14° for straight feed-in of wires 12, 13 without a bend. Again, $\alpha_1^1$ and $\alpha_1$ add up to 90°.

The coil springs made as described are subjected after cold forming to a heat treatment of 250–450° C. for ten minutes, in order to increase the springiness and to remove coiling tensions.

After the treatment, the multiple-coil springs are sewn unto the edges of material 15.

Figure 4:
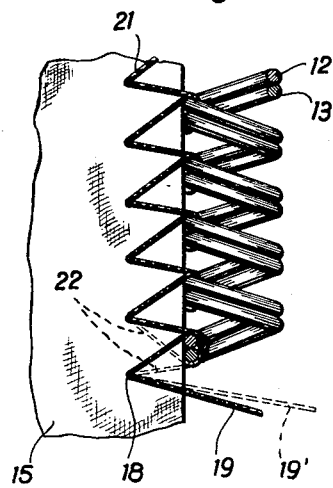
Fig. 4 illustrates the attachment of the multiple-coil spring to the edge of material by means of a zigzag lock stitch seam.

Fig. 4 shows this attachment by means of a zigzag double lock stitch. The needle first pierces the material at 18, then moves sideways and enters at 19 between two windings of the coil spring or at 19' outside of the gaps between two coils.

Each time when the needle enters at 18 and 19, the upper thread 21 and the under thread 22 become looped.

Looping, when the needle enters at 19 or 19', occurs at first loosely, and when the needle subsequently pierces the material 15 at 18, the loop is drawn tight to the winding adjacent to the edge of the material.

Figure 5:
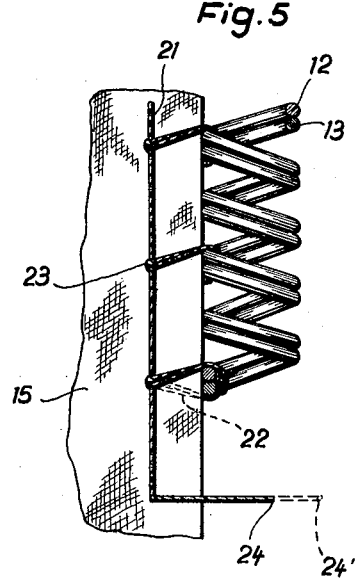
Fig. 5 is a similar showing in which an angular zigzag double lock stitch seam is used.
Figure 6A:
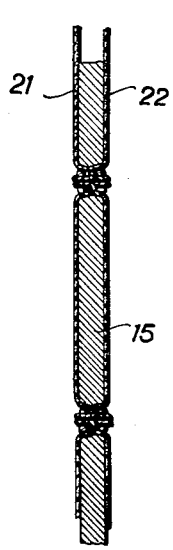
Fig. 6a is a section along line A—B of Fig. 6b.
Figure 6B:
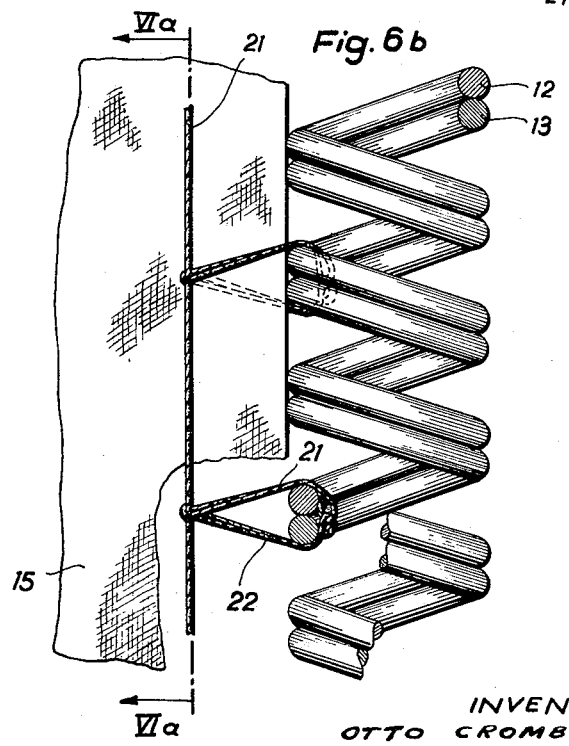
Fig. 6b shows a part of Fig. 5 on an enlarged scale.

As illustrated in Figs. 5 and 6, the needle first pierces the material 15 at 23, moves sideways, enters at 24 or 24', respectively, outside of the windings of the multiple coil spring, whereby again looping of the upper thread 21, and the under thread 22, occurs.

The needle then moves to a point 23, which is near the point 22 of the first stitch, pierces the material again at an angle of 90°, and only thereafter makes an angular movement necessary for entering between two windings or outside thereof. The loosely looped upper and under threads 21, 22, are drawn tight in a manner similar to the one described with reference to Fig. 4 when the needle pierces the material at 23.

For clearer showing, two stitches are shown directly above each other in Fig. 6a. In practice, however, the needle pierces the material twice at the same point.

What we claim is:

1. A process for manufacturing multiple coil springs for slide fasteners with even pitch angles and even pitch throughout the entire length of the springs, which comprises simultaneously unreeling a plurality of smooth wires of equal circular diameters, placing them close together in parallel relationship, feeding them in a straight line to a grooved stationary mandrel, gripping said wires by a sleeve having a smooth bore, so as to enclose the wires while moving them along over said grooved mandrel for shaping them into coils, and withdrawing them from the mandrel in coiled condition, the feeding of said wires occurring at an angle ranging from 70–76° with respect to the direction of travel in the shaping operation, the pitch angle being imparted to the coils in the shaping operation being from 20–14°, whereby the two angles add up to an angle of 90°, and reducing the pitch angle of the coils to from 10–14° during further processing.

2. A process for manufacturing multiple coil springs for slide fasteners with even pitch angles and even pitch throughout the entire length of the springs and for fastening the same to edges of material, particularly for use as closure members for slide fasteners, which comprises unreeling a plurality of smooth wires simultaneously of smooth circular cross-section from stationary spools, placing them close together in parallel relationship, feeding them in a straight line, winding them endlessly by means of a rotating sleeve provided with a grooved mandrel, gripping said wires so as to enclose them while moving them along for shaping them into coils, and withdrawing them from said mandrel in coiled condition, the feeding of said wires occurring at an angle ranging from 70–76° with respect to the common axis of the mandrel and the sleeve and to the direction of travel in the shaping operation, the pitch angle being imparted to the coils in the shaping operation being from 20–14°, whereby the two angles add up to an angle of 90°, assembling the multiple coil springs with the material, and attaching said coil springs to said material with threads in the form of lock stitch loops extending from said material to and over the portions of the individual wire spirals in said coil springs adjacent said material, to hold said wire spirals closely adjacent to each other.

3. A process for manufacturing multiple coil springs for slide fasteners with even pitch angles and even pitch throughout the entire length of the springs, which comprises unreeling a plurality of smooth wires having a minimum strength of 200 kg./mm.$^2$ simultaneously, placing them close together in parallel relationship, feeding them in a straight line, to a grooved mandrel, gripping said wires so as to enclose them while moving them along for shaping them into coils, withdrawing them from said mandrel in coiled condition, the feeding of said wires occurring at an angle ranging from 70–76° with respect to the direction of travel in the shaping operation, the pitch angle being imparted to the coils in the shaping operation being from 20–14°, whereby the two angles add up to an angle of 90°, and subjecting the finished coil spring to a heat treatment at 250–450° C. for 10 minutes.

References Cited in the file of this patent
UNITED STATES PATENTS

| | | |
|---|---|---|
| 296,671 | Bryant | Apr. 8, 1884 |
| 1,730,553 | Blair | Oct. 8, 1929 |
| 2,346,024 | Goldner | Apr. 4, 1944 |
| 2,541,729 | Wahl | Feb. 13, 1951 |